United States Patent
Saitou et al.

(10) Patent No.: US 11,507,047 B2
(45) Date of Patent: Nov. 22, 2022

(54) TOOL PATH COMPENSATION DEVICE

(71) Applicant: FANUC CORPORATION, Yamanashi (JP)

(72) Inventors: Kiwamu Saitou, Yamanashi (JP); Osamu Hanaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 110 days.

(21) Appl. No.: 16/987,603

(22) Filed: Aug. 7, 2020

(65) Prior Publication Data
US 2021/0063994 A1 Mar. 4, 2021

(30) Foreign Application Priority Data
Sep. 3, 2019 (JP) .............................. JP2019-160230

(51) Int. Cl.
*G05B 19/404* (2006.01)

(52) U.S. Cl.
CPC .. *G05B 19/404* (2013.01); *G05B 2219/49303* (2013.01)

(58) Field of Classification Search
CPC ........ G05B 19/404; G05B 2219/49303; G05B 19/4093; G05B 2219/36349; G05B 19/4097; G05B 2219/31027; Y02P 90/02
See application file for complete search history.

(56) References Cited

U.S. PATENT DOCUMENTS

| | | | | |
|---|---|---|---|---|
| 2007/0046677 A1* | 3/2007 | Hong | ..................... | G05B 19/41 345/442 |
| 2013/0304247 A1* | 11/2013 | Mackman | .......... | G05B 19/4093 700/174 |
| 2014/0083731 A1* | 3/2014 | Chow | ................... | G06F 1/1626 174/50 |
| 2018/0299859 A1* | 10/2018 | Kaneko | ................ | G05B 19/402 |

FOREIGN PATENT DOCUMENTS

WO  2017/110236 A1  6/2017

* cited by examiner

*Primary Examiner* — Kenneth M Lo
*Assistant Examiner* — Mohammed Shafayet
(74) *Attorney, Agent, or Firm* — Studebaker & Brackett PC

(57) ABSTRACT

A tool path compensation device according to an aspect of the present disclosure includes: a tool path acquisition unit which acquires tool path information that specifies a tool path on which a tool machining a workpiece moves by way of a plurality of command points through which the tool should pass; a tool shape acquisition unit which acquires tool shape information that specifies a shape of the tool; a target shape acquisition unit which acquires target shape information specifying a target shape after machining of the workpiece; and a density adjustment unit which adjusts a density of the command points, so that the density of the command points becomes larger as curvature of the target shape increases.

5 Claims, 6 Drawing Sheets

TOOL PATH COMPENSATION DEVICE

This application is based on and claims the benefit of priority from Japanese Patent Application No. 2019-160230, filed on 3 Sep. 2019, the content of which is incorporated herein by reference.

BACKGROUND OF THE INVENTION

Field of the Invention

The present invention relates to a tool path compensation device.

Related Art

In order to machine a workpiece by a tool in a machine tool, for example, it is common to create commands for a numerical control device so as to make the tool move relatively along a target shape after machining of the workpiece (product shape) generated by CAD or the like. Since the tool has a three-dimensional shape, the profile of the movement path of the tool and the surface shape of the workpiece after machining do not perfectly match. For this reason, a device which compensates the movement path of the tool has been proposed that takes consideration of the shape of the tool (for example, refer to Patent Document 1).

Patent Document 1: PCT International Publication No. WO2017/110236

SUMMARY OF THE INVENTION

Normally, the information of a tool path on which the tool moves is expressed as a set of coordinates of a plurality of command points through which the tool should pass. In other words, in a machine tool, the tool moves on a path made by connecting the plurality of command points included in the tool path information by straight lines. For this reason, in the case of the target shape of the workpiece having a curved surface, when moving the tool along a tool path made by connecting a plurality of command points by straight lines, the tool may veer away from the target shape, or cut into the target shape between the command points. In addition, if the position of a command point is not appropriate, the tool may veer away from the target surface or cut into the target surface at the command point. Error thereby arises relative to the target shape for the shape of the workpiece after machining. Therefore, a tool path compensation device has been desired which can compensate the tool path on which the tool moves so as to be able to accurately machine the workpiece according to the target shape.

A tool path compensation device according to an aspect of the present disclosure includes: a tool path acquisition unit which acquires tool path information that specifies a tool path on which a tool machining a workpiece moves by way of a plurality of command points through which the tool should pass; a tool shape acquisition unit which acquires tool shape information that specifies a shape of the tool; a target shape acquisition unit which acquires target shape information specifying a target shape after machining of the workpiece; and a density adjustment unit which adjusts a density of the command points, so that the density of the command points becomes larger as curvature of the target shape increases.

According to the tool path compensation device of the present disclosure, it is possible to compensate the tool path on which the tool moves so as to be able to accurately machine the workpiece according to the target shape.

DETAILED DESCRIPTION OF THE INVENTION

First Embodiment

Figure 1:
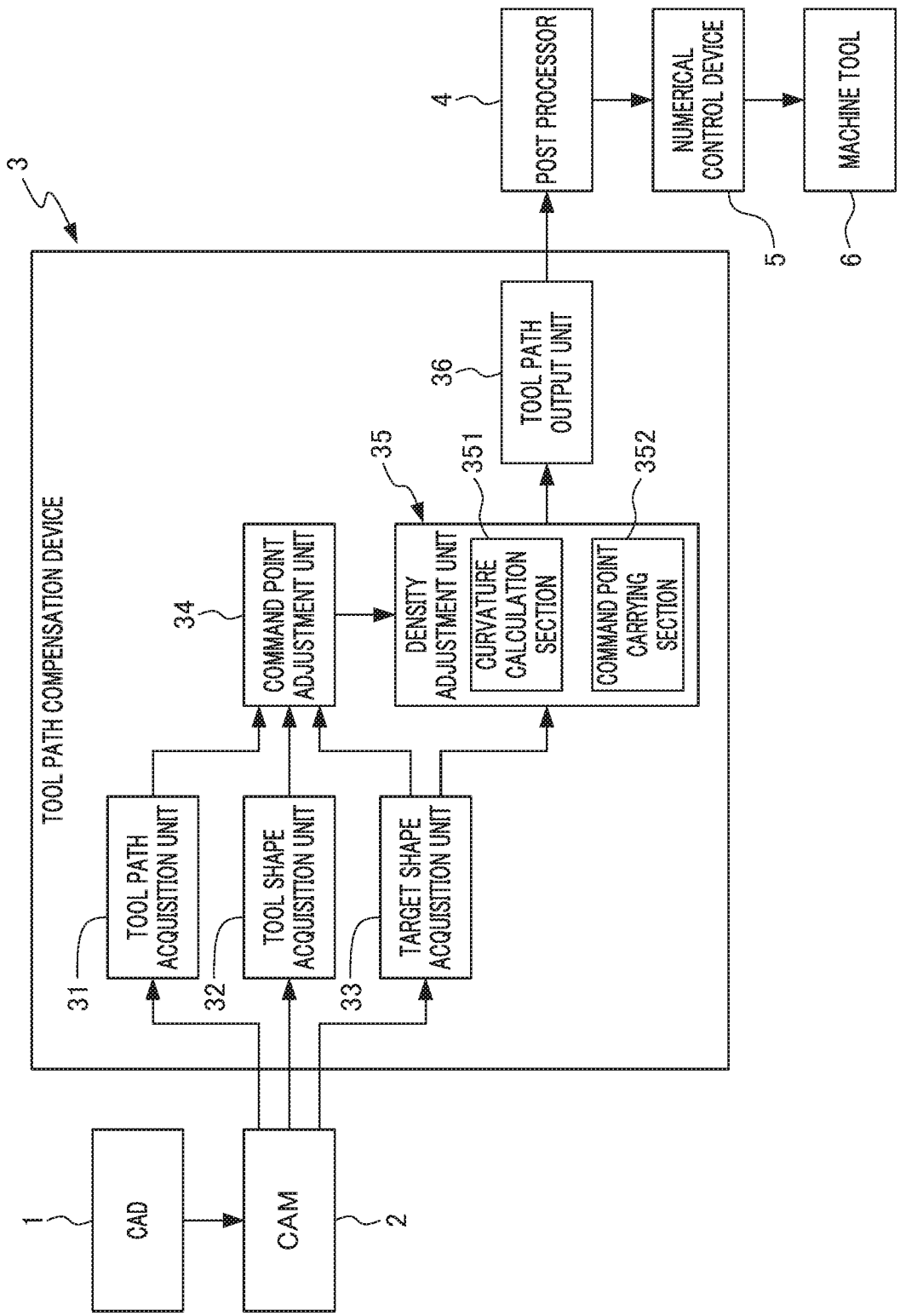
FIG. 1 is a block diagram showing the configuration of a machining system equipped with a tool path compensation device according to a first embodiment of the present disclosure.

Hereinafter, an embodiment of the present disclosure will be explained while referencing the drawings. FIG. 1 is a block diagram showing the configuration of a machining system equipped with a tool path compensation device according to a first embodiment of the present disclosure. The machining system of FIG. 1 includes: CAD 1, CAM 2, tool path compensation device 3 of an embodiment of the present disclosure; post processor 4, numerical control device 5, and machine tool 6.

The CAD 1 is a known system which performs design using a computer. In other words, the CAD 1 is used for designing a target shape (product shape) after machining of a workpiece to be machined in the machine tool 6. The target shape may be specified by a flat surface, cylindrical surface, spherical surface, Bezier surface, NURBS curved surface, etc.

The CAM 2 is a known system which generates a machining program or the like used by the numerical control device 5 controlling the machine tool 6, in order to machine the workpiece into the target shape designed by the CAD 1 by way of the machine tool 6. The CAM 2 generates tool path information specifying the tool path on which the tool machining the workpiece moves, by way of a plurality of command points through which the tool should pass. For this reason, the CAM 2 may generate the shape of a machined region corresponding to the target shape created by the CAD 1. The tool path information can be generated in a format of CL (Cutter Location) data which does not take consideration of the configuration and settings of each machine tool 6.

The tool path information may include information about which portion of the tool moves on the tool path. As the portion (hereinafter may be referred to as reference point) of the tool moving on the tool path, it is possible to exemplify the tool tip, center of the tool shape (for example, ball center of ball end mill), or the like. In addition, the tool path information may include information of whether movement upon the tool moving on the tool path does cutting feed or non-cutting feed (rapid traverse). Furthermore, the tool path information may include information of the specific feed speed upon the tool moving on the tool path.

Figure 2:
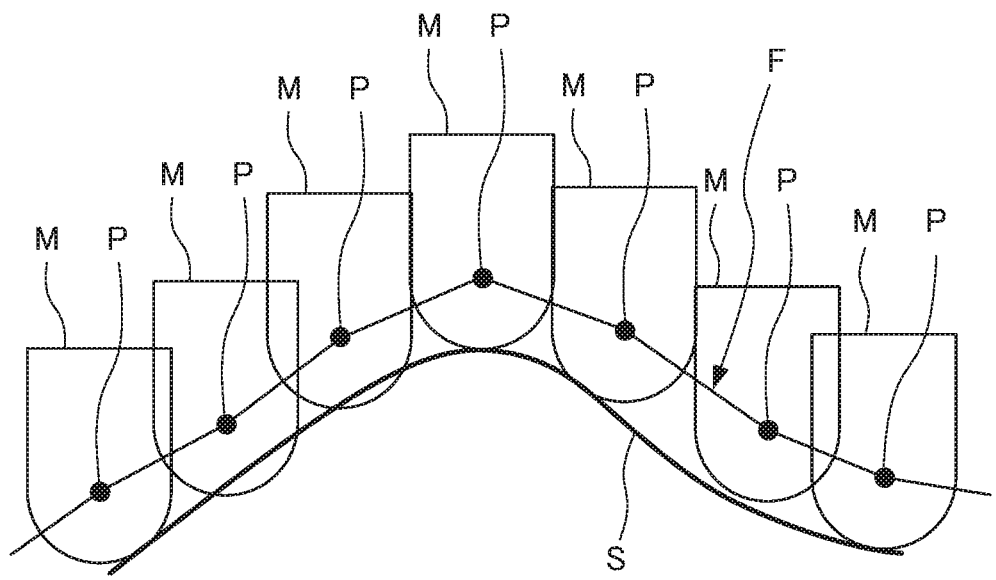
FIG. 2 is a schematic diagram exemplifying a tool path created by CAM.

FIG. 2 shows the tool path F including a plurality of command points P. FIG. 2 shows a shape M of a tool on each command point P and target shape S. As shown, the shape M of the tool on the command point P ideally contacts the target shape S; however, it may actually bite into the target surface S, or veer away from the target shape S.

The tool path compensation device 3 has: a tool path acquisition unit 31, tool shape acquisition unit 32, target shape acquisition unit 33, command point adjustment unit 34, density adjustment unit 35, and tool path output unit 36. The tool path compensation device 3, for example, can be realized by executing the appropriate control programs in a computer device equipped with a CPU, memory I/O interface, etc. The tool path acquisition unit 31, tool shape acquisition unit 32, target shape acquisition unit 33, command point adjustment unit 34, density adjustment unit 35 and tool path output unit 36 of the tool path compensation device 3 are distinguished functionally, and may not necessarily be clearly distinguishable in the physical configuration and program configuration. In addition, the tool path compensation device 3 may be integrally configured with other devices such as the CAM 2 and post processor 4. In other words, the tool path compensation device 3 may be realized by adding a control program to the CAM 2, post processor 4 or the like.

The tool path acquisition unit 31 acquires the tool path information generated by the CAM 2. The tool path acquisition unit 31 may acquire the tool path information via a server, recording medium or the like (not shown).

The tool shape acquisition unit 32 acquires tool shape information specifying the shape of the tool. The tool shape acquisition unit 32 can be configured so as to acquire the tool shape information used by the CAM 2 in order to generate the tool path information from the CAM 2. In addition, the tool shape acquisition unit 32 may be configured so as to acquire tool shape information from a server, recording medium or the like (not shown).

The target shape acquisition unit 33 acquires the target shape information specifying the target shape after machining of the workpiece. The target shape information may be information of the product shape generated in the CAD 1, or may be information of the shape of a machined region created by the CAM 2 (for example, shape of the machined surface approximated as a set of a plurality of planes). In other words, the target shape acquisition unit 33 may acquire the target shape information from the CAD 1, or may acquire the target shape information from the CAM 2. In addition, the target shape acquisition unit 33 may acquire target shape information from another device or recording medium.

Figure 3:
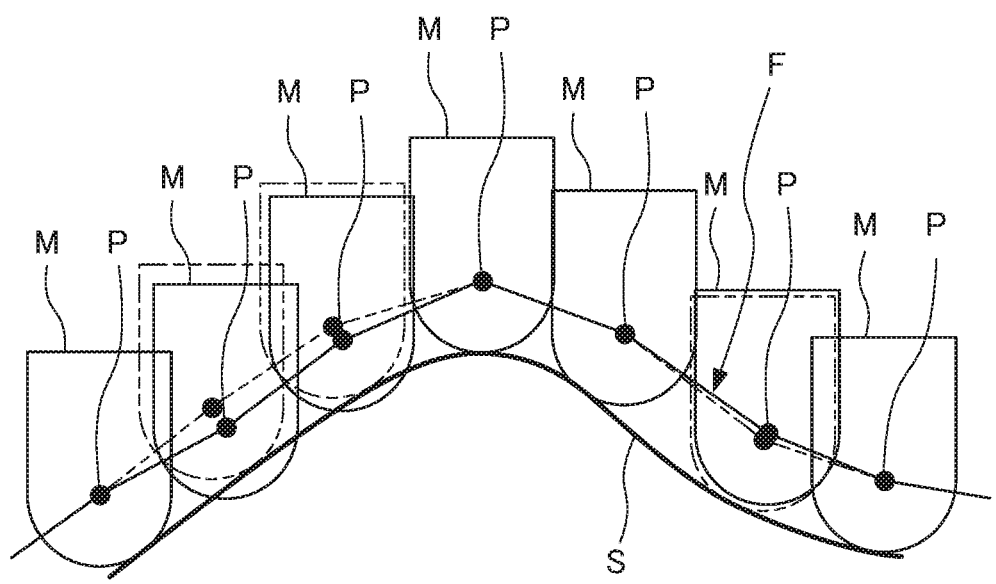
FIG. 3 is a schematic diagram exemplifying positional adjustment of a command point of the tool path in FIG. 2.

The command point adjustment unit 34 adjusts the position of the command point P so that the shape M of the tool contacts the target shape S, based on the tool shape information and target shape information, as shown in FIG. 3. In other words, the command point adjustment unit 34 compensates the position of the command point P of the tool path information so that the model of the tool at the command point P makes contact with the model of the product. It should be noted that "shape of the tool contacts the target shape" permits a certain error, and indicates that the interval or overlap amount of the target shape S and shape M of the tool is no more than a certain value.

The command point adjustment unit 34 may move the command point P in the rotation axis direction of the tool. By moving the command point P in the rotation axis direction of the tool, it is often possible to suppress the computation load of positional adjustment of command points p. In more detail, the command point adjustment unit 34 calculates the distance between the target shape S and the shape M of the tool on the command point P of the tool path F, and in the case of this distance exceeding a permitted value, may move the command point P in the rotation axis direction of the tool so that the shape M of the tool makes contact with the target shape S.

Figure 4:
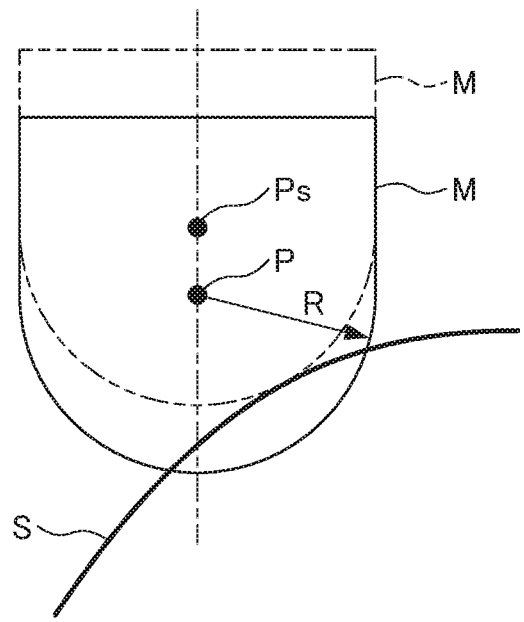
FIG. 4 is a schematic diagram showing in detail a positional adjustment example of command points of the tool path of a ball end mill.

FIG. 4 shows a case of the tool being a ball end mill. The figure shows the shape M of the tool before adjustment by a solid line, and the shape M of the tool after adjustment by a two-dot chain line, with the command point after adjustment defined as Ps. The ball end mill has a tip of the shape M which is a spherical shape, and cuts the workpiece with a portion of this spherical shape. In this example, the reference point of the ball end mill positioned at the command point P is the center of the ball shape of the tool. The distance between the shape M of the tool and the target shape S is calculated as the difference between the distance between the command point P and the target shape S, and the radius R of the ball shape of the tool tip. For this reason, the adjustment of the command point P defines a position to which moving the command point P in the rotation axis direction of the tool as the position of the command point Ps after adjustment, so that the distance between the command point P and target shape S equals the radius R of the tool.

Figure 5:
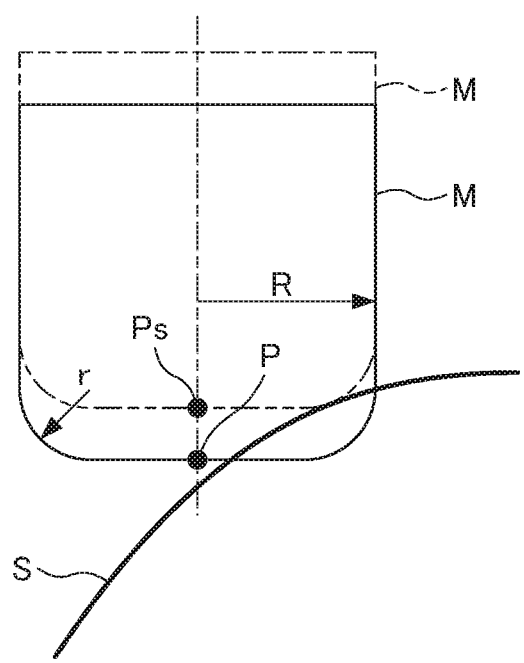
FIG. 5 is a schematic diagram showing in detail a positional adjustment example of command points of the tool path of a radius end mill.

FIG. 5 shows a case of the tool being a radius end mill. The radius end mill cuts the workpiece at a corner of radius r connecting a planar part of the tip or plane of the tip and a side surface of the cylindrical shape of radius R. The reference point of the tool positioned at the command point P of the radius end mill is a tool tip position on the rotation axis. The distance between the shape M of the tool and the target shape S is the value of the larger among: (1) the difference between the height of the command point P and the highest point of the target shape S in a range in which the distance from the rotation axis of the tool is (R-r) or less; and (2) the difference between the radius r at the corner and the shortest distance between the target shape S and the center of the corner in a cross section through the rotation axis in a range in which the distance from the rotation axis of the tool is (R-r) or more and R or less. For this reason, adjustment of a command point P defines the position to which moving the command point P in the rotation axis direction of the tool so that the value of the larger among (1) and (2) becomes 0 as the adjusted command point Ps. It should be noted that, in the case of the tool being a square end mill, it may be considered that the radius r at a corner of the radius end mill is 0.

In addition, the command point adjustment unit 34 may move the command point P in the normal direction to the target shape S. By moving the command point P in the normal direction to the target shape S, it is possible to make the movement amount of the command point P relatively small.

Figure 6:
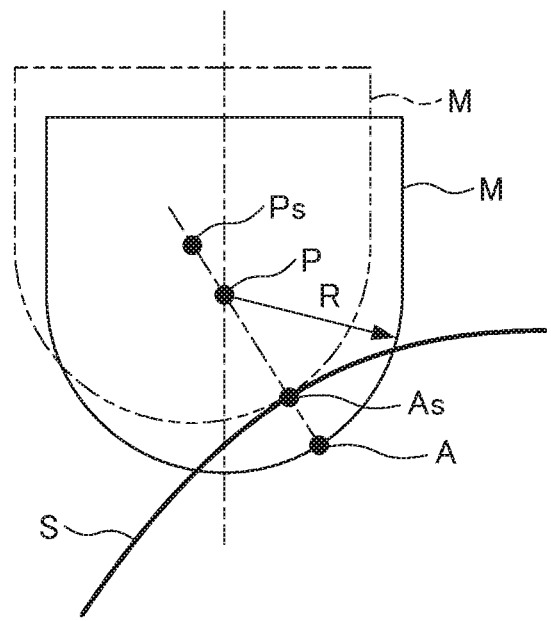
FIG. 6 is a schematic diagram showing in detail positional adjustment example differing from FIG. 4 of command points of a tool path of a ball end mill.

FIG. 6 shows a case of the tool being a ball end mill. The adjusted command point Ps is defined as a point moving the command point P prior to adjustment in the normal direction of the closest point A to the command point P prior to adjustment of the target shape S. It should be noted that, in the case of the distance between the command point P and the nearest point A of the target shape S being larger than the radius R of the tool, the command point P is moved in the direction bringing towards the nearest point A, and in the case of the distance between the command point P and the nearest point A being smaller than the radius R of the tool, the command point P is moved in a direction distancing from the nearest point A.

The nearest point As of the target shape S relative to the adjusted command point Ps is a point at which the tool shape M and target shape S make contact, and becomes a cutting point at which cutting the workpiece by the tool. The command point adjustment unit 34 stores the coordinates of this cutting point As, and may supply to the density adjustment unit 35.

Figure 7:
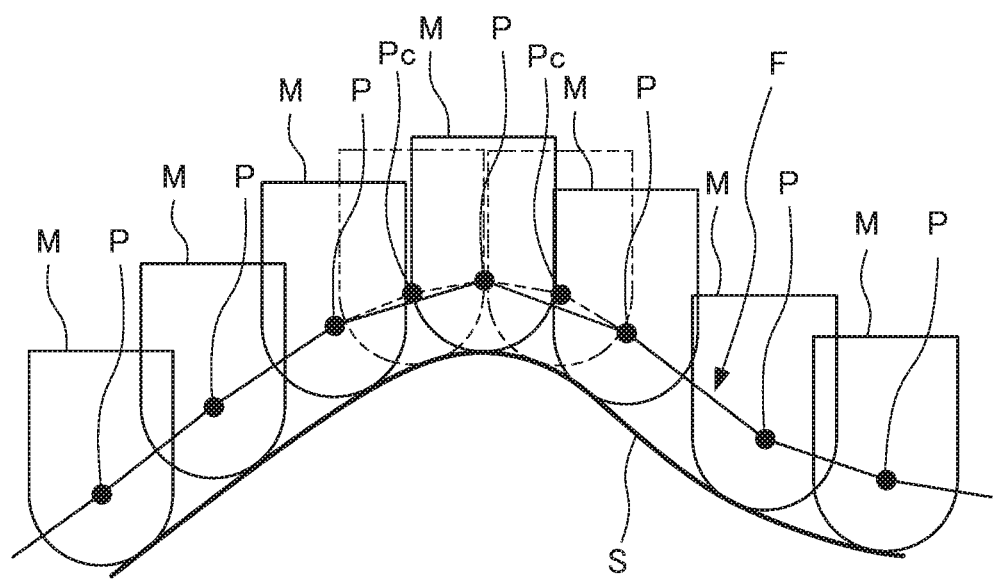
FIG. 7 is a schematic diagram exemplifying adjustment of the density of command points of the tool path in FIG. 3.

The density adjustment unit 35 adjusts the density of command points P so that the density of command points P becomes larger as the curvature of the target shape S increases. In other words, the density adjustment unit 35 adds command points P to the tool path information according to the curvature of the target shape S, as shown in FIG. 7. By making the interval of command points P smaller at a portion where the curvature of the target shape S is large, it is possible to make the displacement between the target shape S and the cutting point at which the tool acts on the workpiece between adjacent command points P smaller. In addition, the density adjustment unit 35 may delete a part of the command points P in the tool path information as needed. By making a smaller number of command points P at portions of the target shape S having little curvature, it is possible to reduce the data volume of the tool path information, and reduce the computational load on the post processor 4 and numerical control device 5.

The density adjustment unit 35 can be established as a configuration having a curvature calculation section 351 which calculates the curvature of the target shape S, and a command point varying section 352 which adds or subtracts command points P.

Although the curvature calculation section 351 may calculate the curvature of all positions of the target shape S, it may selectively calculate the curvature of the target shape S at the cutting point A acquired from the command point adjustment unit 34. By calculating the curvature of the cutting point A, it is possible to derive the appropriate density of the command points with a relatively small computation load. More specifically, it is possible to calculate the cutting points $A(i-1)$, $A(i)$, $A(i+1)$ at three continuous command points $P(i-1)$, $P(i)$, $P(i+1)$, and calculate the curvature radius (reciprocal of curvature) of the target shape S at the command point $P(i)$ as the radius of a circle through the cutting points $A(i-1)$, $A(i)$, $A(i+1)$.

The command point varying section 352 adds a command point Pc such that the tool shape M contacts the target shape S, at a portion of the target shape S where the curvature is large, as shown in detail in FIG. 7. Based on the curvature radius and the distance from the cutting point $A(i)$ until the next cutting point $A(i+1)$, the deviation range of the trajectory of the cutting point A and the target shape S in the case of linearly moving the tool from the command point $P(i)$ to the next command point $P(i+1)$ is obtained. In the case of this deviation range exceeding a permitted value, one or more command points Pc are added between the command point $P(i)$ and next command point $P(i+1)$ so that the deviation range becomes no more than the permitted value. In addition, in the case of the deviation range between the cutting point $A(i)$ and the next cutting point $A(i+1)$ being no more than the permitted value, if a cutting point $A(i+2)$ at the next command point $P(i+2)$ is obtained and the deviation range when linking from the cutting point $A(i)$ to the cutting point $A(i+2)$ is no more than the permitted value, it is possible to determine that the command point $P(i+1)$ may be deleted.

The tool path output unit 36 stores the tool path information compensated by the command point adjustment unit 34 and density adjustment unit 35, and outputs to the post processor 4 as needed.

The post processor 4 converts the data format of the tool path information outputted from the tool path compensation device 3 into a data format which can be processed by the numerical control device 5. Typically, the post processor 4 converts the tool path information of CL data format into G code. As the post processor 4, a well-known processor can be employed.

The numerical control device 5 controls the machine tool 6, in accordance with the tool path information inputted from the post processor 4. As the numerical control device 5, a well-known device can be employed.

The machine tool 6 machines a workpiece using tools, in accordance with instructions from the numerical control device 5. As the machine tool 6, a well-known machine can be employed.

In the above way, the machining system of FIG. 1 can accurately machine the workpiece according to the target shape S, due to the deviation range between the cutting point A and target shape S being suppressed by equipping the tool path compensation device 3. In addition, by the shift between lines on which the tool moves over the surface of the workpiece becoming smaller, since it is possible to suppress an unintended linear pattern from being formed on the surface of the workpiece, the aesthetics of the product obtained by machining the workpiece can be improved.

Second Embodiment

Figure 8:
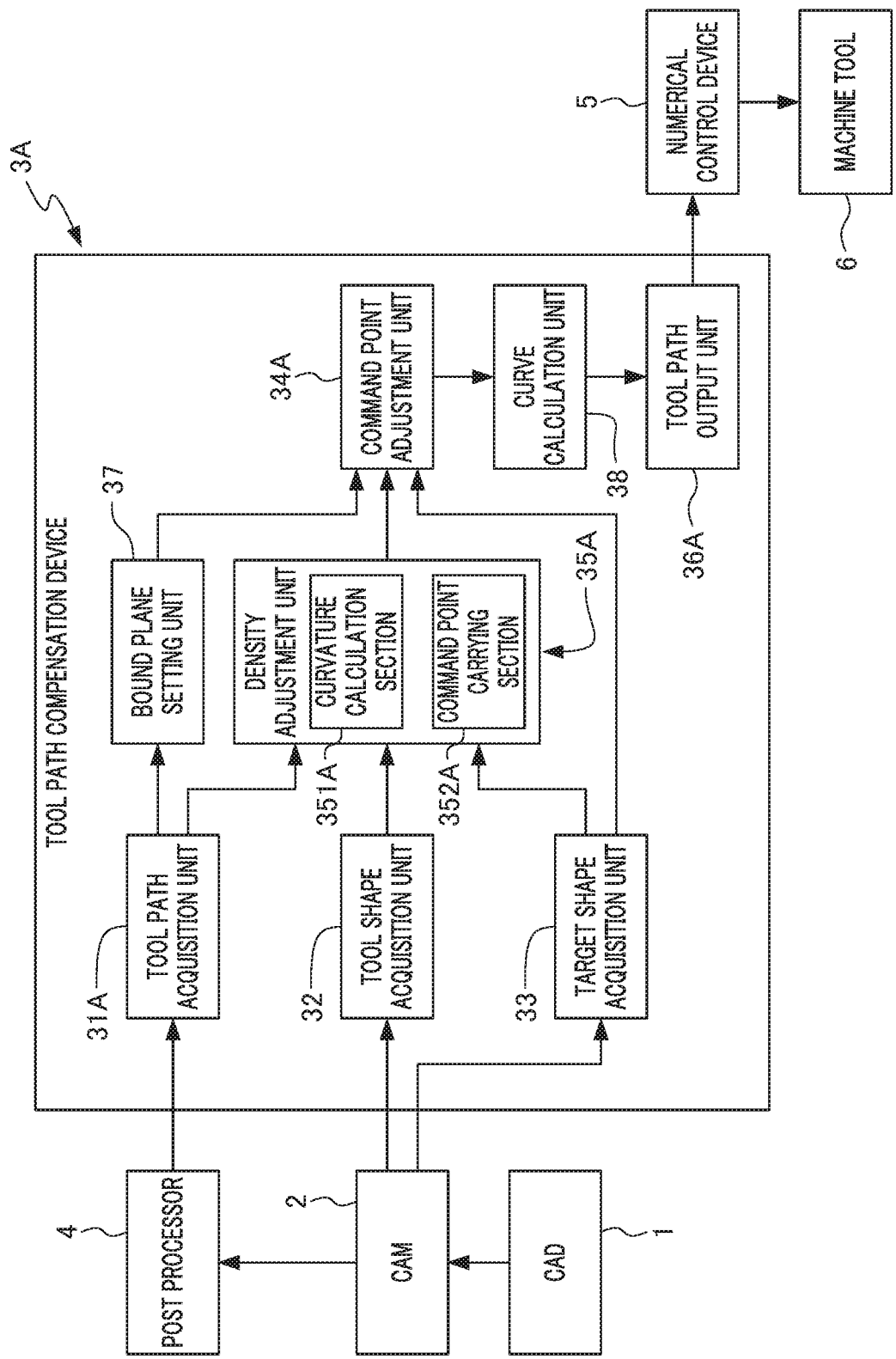
FIG. 8 is a block diagram showing the configuration of a machining system equipped with a tool path compensation device according to a second embodiment of the present disclosure.

FIG. 8 is a block diagram showing the configuration of a machining system equipped with a tool path compensation device according to a second embodiment of the present disclosure. The machining system of FIG. 8 includes the CAD 1, the CAM 2, the tool path compensation device 3A according to an embodiment of the present disclosure, the post processor 4, the numerical control device 5 and the machine tool 6. For the machining system of FIG. 8, the same reference symbols will be attached to constituent elements that are identical to the machining system of FIG. 1, and redundant explanations will be omitted. In the machining system of FIG. 8, the tool path compensation device 3A compensates the machining program written in G code, for example, to be inputted to the numerical control device 5 by the post processor 4.

The tool path compensation device 3A includes: a tool path acquisition unit 31A, tool shape acquisition unit 32, target shape acquisition unit 33, density adjustment unit 35A, bound plane setting unit 37, command point adjustment unit 34A, curve calculating unit 38, and tool path output unit 36A. The tool path compensation device 3A, for example, can be realized by causing the appropriate control programs to be executed in a computer device equipped with a CPU, memory I/O interface, etc., and may be configured integrally with the post processor 4, numerical control device 5, or the like.

The tool path acquisition unit 31A acquires the tool path information from the post processor 4. Therefore, the tool path acquired by the tool path acquisition unit 31A is set in a format such as G code, for example.

The density adjustment unit 35A adjusts the density of the command points P, so that the density of command points P becomes larger as the curvature of the target shape S increases. The density adjustment unit 35A can be established as a configuration having a curvature calculation section 351A which calculates the curvature of the target shape S, and a command point varying section 352A which adds and deletes command points P.

The curvature calculation section 351A calculates the curvature at a nearest point A which is closest to each command point P of the target shape S. More specifically, it is possible to set the radius of a circle passing through the three nearest points A as the curvature radius of the target shape S at the nearest point A at the center.

The command point varying section 352A adds a new command point P on a line linking adjacent command points P, at a portion of the target shape S at which curvature is large.

The bound plane setting unit 37 sets a bound plane to which the tool (command point) should be made to move within this plane. In the case of the tool path before compensation extending within a certain surface, if the tool path leaves from the original surface by way of compensation, there is a possibility of undesired tool roll occurring. For this reason, the plane on which the tool path prior to compensation exists is defined as the bound plane (also called drive plane). As an example, the XZ plane becomes the bound plane, by scan line machining in which the tool moves and machines within the XZ plane. In addition, the bound plane may be a curved surface. In this case, the bound plane is set for every command point P. More specifically, the bound plane of the command point P(i) can be set as a flat surface including the three points of this command point P(i), and the commands points P(i−1) and P(i+1) before and after.

The command point adjustment unit 34A adjusts the position of the command point P so that the shape M of the tool contacts the target shape S, by moving the position of the command point P along the bound plane of the original command point P. It is thereby possible to suppress the occurrence of tool roll, etc. by adjustment of the command point P.

Figure 9:
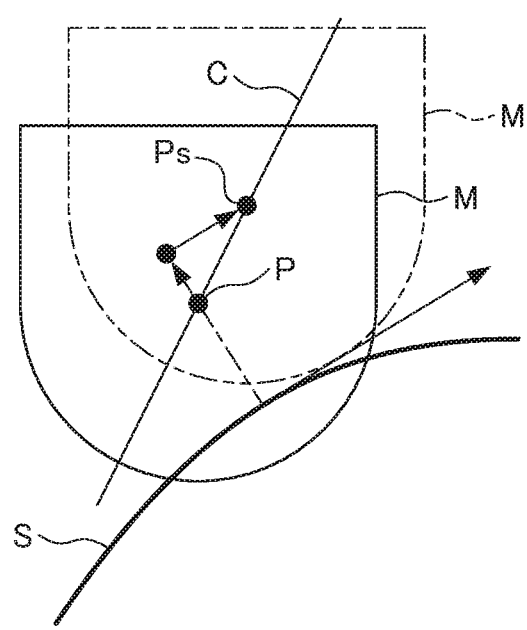
FIG. 9 is a schematic diagram exemplifying positional adjustment of command points of a tool path by the tool path compensation device in FIG. 8.

The command point adjustment unit 34A, for example, may arrange the adjusted command point Ps on the bound plane C, by moving the command point P in the rotation axis direction of the tool, normal direction at cutting point A of the target shape S, or the like, and then moving this moved command point P further in the tangential direction of the target shape S at cutting point A, as shown in FIG. 9. In this case, since the relative position between the tool shape M and target shape S upon moving the command point P on the bound plane C is shifted, it is preferable for the distance between the tool shape M and target shape S to be recalculated, and movement of the command point P to be repeated until this distance becomes no more than the permitted value.

The curve calculation unit 38 calculates the tool path F between adjacent command points P as a curve passing through the command points P, Ps, Pc. In the case of the target shape S being a smooth curved surface, it is thereby possible to decrease the deviation between the target shape S and trajectory of the cutting points A. The curve calculated by the curve calculation unit 38 can be established as a circular arc, spline curve, Bezier curve, NURBS curve or the like, for example.

The tool path output unit 36A stores the tool path information in which command points P are adjusted in the numerical control device 5, and outputs to the numerical control device 5 as needed.

Although embodiments of the present disclosure have been explained above, the present disclosure is not to be limited to the aforementioned embodiments. In addition, the effects described in the aforementioned embodiments are merely listing the most preferred effects produced from the present disclosure, and the effects from the present disclosure are not limited to those described in the aforementioned embodiments.

In the case of there being little error in the command points of given tool path information, and the density adjustment unit adding command points such that the shape of the tool contacts the target shape as in the first embodiment, the command point adjustment unit may be omitted.

EXPLANATION OF REFERENCE NUMERALS

1 CAD
2 CAM
3 tool path compensation device
4 post processor
5 numerical control device
6 machine tool
31, 31A tool path acquisition unit
32 tool shape acquisition unit
33 target shape acquisition unit
34, 34A command point adjustment unit
35 density adjustment unit
36, 36A tool path output unit
37 bound plane setting unit
38 curve calculation unit
351, 351A curvature calculation section
352, 352A command point varying section

What is claimed is:

1. A tool path compensation device comprising:
   a tool path acquisition unit which acquires tool path information that specifies a tool path including a plurality of command points, the plurality of command points being points that a tool passes through when machining a workpiece;
   a tool shape acquisition unit which acquires tool shape information that specifies a shape of the tool;
   a target shape acquisition unit which acquires target shape information specifying a target shape after machining of the workpiece; and
   a density adjustment unit that adjusts a density of the command points, so that the density of the command points becomes larger as curvature of the target shape increases, by:
      determining a first deviation range of a portion of the tool path between adjacent ones of the command points to the target shape,
      determining a permitted value for the first deviation range, and
      adding command points between the adjacent ones of the command points until the first deviation range is less than or equal to the permitted value.

2. The tool path compensation device according to claim 1, further comprising a command point adjustment unit which adjusts a position of one of the command points so that the shape of the tool contacts the target shape, based on the tool shape information and the target shape information.

3. The tool path compensation device according to claim 2, further comprising a bound plane setting unit which sets a bound plane in which to cause the tool to move within a plane thereof,
   wherein the command point adjustment unit moves the position of the command point along the bound plane.

4. The tool path compensation device according to claim 1, further comprising a curve calculation unit which calculates the tool path between the adjacent ones of the command points as a curve passing through the command points.

5. The tool path compensation device according to claim 1, wherein the density adjustment unit further determines a second deviation range of a link from nonadjacent ones of the command points to the target shape and deletes one of the command points positioned between the nonadjacent ones of the command points if the second deviation range is less than or equal to the permitted value.

\* \* \* \* \*